United States Patent [19] [11] 4,415,843
Feldman [45] Nov. 15, 1983

[54] VOLTAGE REGULATOR

[75] Inventor: Gary Feldman, Wilmette, Ill.

[73] Assignee: Baxter Travenol Laboratories, Inc., Deerfield, Ill.

[21] Appl. No.: 243,539

[22] Filed: Mar. 13, 1981

[51] Int. Cl.³ .......................... G08B 21/00; H02J 7/00
[52] U.S. Cl. .................................. 318/139; 324/376; 324/426; 318/305
[58] Field of Search ............................. 318/309–310, 318/305, 329, 330, 814, 139; 324/433, 426–427, 429; 180/65 R; 320/13, 22, 30, 32, 38

[56] References Cited

U.S. PATENT DOCUMENTS

| 3,401,335 | 9/1968 | Perkinson . |
| 3,566,252 | 2/1971 | Nercessian . |
| 3,815,001 | 6/1974 | Jamieson . |
| 3,855,511 | 12/1974 | Smith . |
| 3,947,753 | 3/1976 | Gushima et al. . |
| 3,997,888 | 12/1976 | Kremer ................................ 324/426 |
| 4,007,415 | 2/1977 | Toyoda . |
| 4,075,970 | 2/1978 | Blake et al. . |
| 4,151,456 | 4/1979 | Black . |
| 4,211,961 | 7/1980 | Marumoto et al. . |
| 4,215,383 | 7/1980 | Boyd et al. . |
| 4,229,688 | 10/1980 | Knox et al. ............................ 320/13 |
| 4,251,743 | 2/1981 | Hareyama . |
| 4,264,785 | 4/1981 | Jacobson . |
| 4,274,036 | 6/1981 | Fukasaku et al. . |

Primary Examiner—J. V. Truhe
Assistant Examiner—A. Evans
Attorney, Agent, or Firm—John P. Kirby, Jr.; Bradford R. L. Price; George H. Gerstman

[57] ABSTRACT

There is disclosed a battery-operated motor control circuit. An adjustable voltage reference (18, 26, 28) is coupled to the battery (10), with the output of the adjustable voltage reference being coupled to the positive input of an operational amplifier (34). The negative input of the operational amplifier (34) is coupled to ratio control means (60) for setting the gain of the operational amplifier (34) and thus setting the motor (54) to a selected speed. A transistor-pair amplifier (38, 40) is coupled to the output of the operational amplifier (34), with a negative feedback line (50) being coupled from the output of the transistor amplifier to the negative input of the operational amplifier. The motor is also coupled to the output of the transistor amplifier.

15 Claims, 1 Drawing Figure

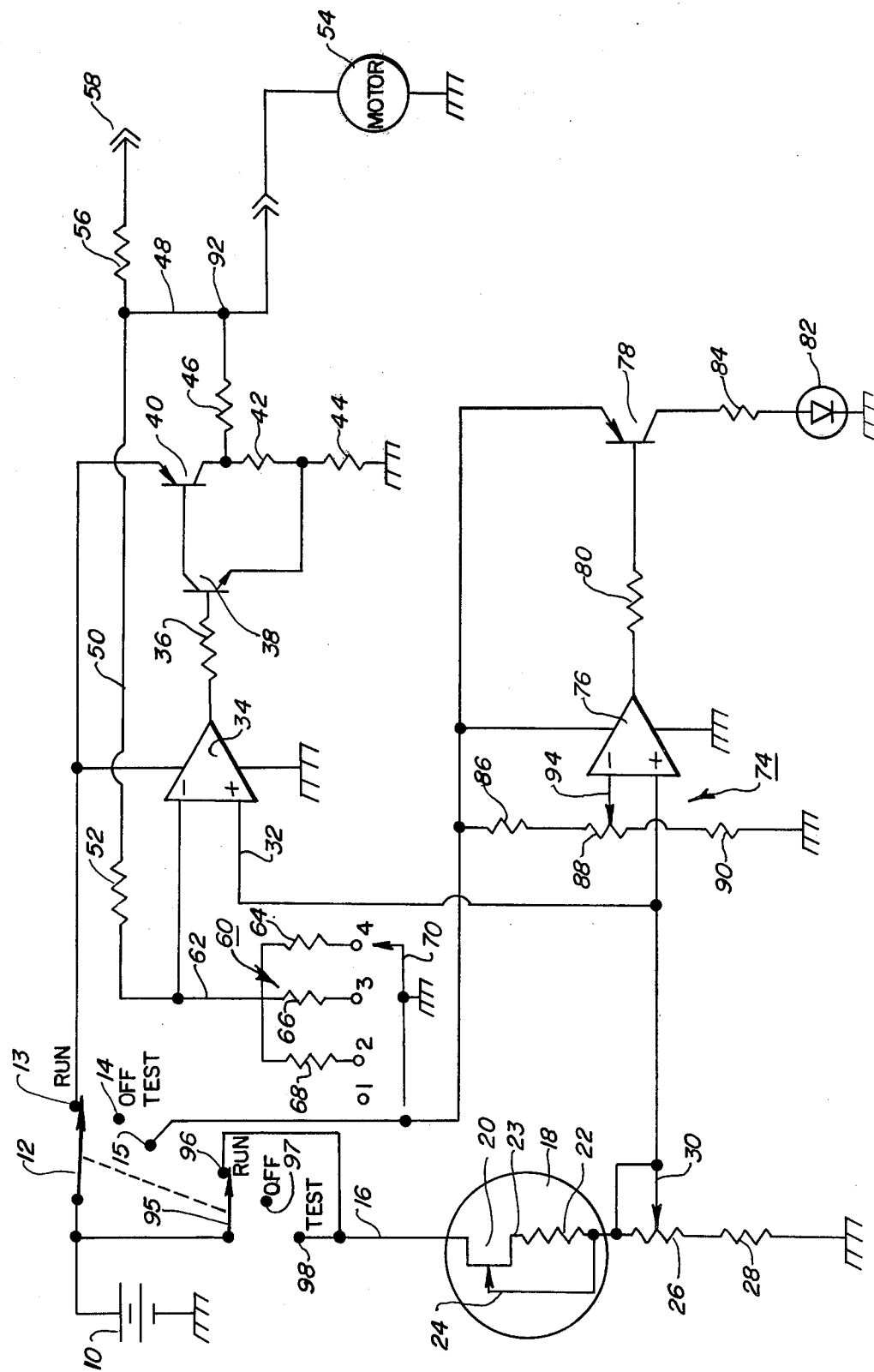

VOLTAGE REGULATOR

FIELD OF THE INVENTION

The present invention concerns a novel voltage regulator circuit, and more particularly, a voltage regulator circuit that has significant utility to the control of a battery-operated motor.

BACKGROUND ART

Ambulatory low volume infusion pumps are known for use in connection with infusion of various fluids to a patient. In one prior art ambulatory battery-operated infusion device, a physician calibrates for a flow rate by adjusting a trimming potentiometer and viewing the adjustment on a meter. Various inaccuracies have been found using this prior art system.

In order to have a successful ambulatory infusion pump, it is essential that the pump have predictable variable speeds in order to give predictable flow rates. The selected flow rates must remain constant over various states of charge of the battery. Further, a reasonable torque control is required in order to be able to control the flow rates over the different speed settings.

It is, therefore, an object of the invention to provide a voltage regulator circuit that is operative with a battery-operated motor to provide predictable accurate flow rates (motor speeds) notwithstanding variable loads and notwithstanding the variable input voltages resulting from variations in the condition of the battery voltage.

It is another object of the present invention to provide a voltage regulator circuit which is constructed to have a terminal which can be connected to a computer or the like to measure the functioning of the circuitry, including the actual flow rates at all the speeds, the battery voltage and the current used.

A further object of the present invention is to provide a voltage regulator circuit that can be enclosed in a small module and be completely testable with a single output.

Other objects and advantages of the present invention will become apparent as the description proceeds.

DISCLOSURE OF THE INVENTION

In accordance with the present invention, a voltage regulator circuit is provided which comprises a DC voltage input and means coupled to the input for providing a voltage reference. First amplifier means having its positive input coupled to the voltage reference means is provided and the negative input of the first amplifier means is coupled to ratio control means for setting the gain of the first amplifier means. Negative feedback means are coupled from an output of the first amplifier means to the negative input of the first amplifier means.

In the illustrative embodiment, the voltage reference means comprises a current regulating circuit in series with a potentiometer. The arm of the potentiometer is coupled to the positive input of the first amplifier means, thereby providing an adjustable voltage reference. The first amplifier means includes a pair of transistors connected to provide a double inversion and the ratio control means comprises a plurality of resistors and means for coupling to ground a selected resistor of the plurality of resistors.

In the illustrative embodiment, the feedback means includes a series resistor. The ratio control means is operative to provide a voltage ratio factor at the output of the first amplifier means that is equal to about $1 + R_{fb}/R_g$ where $R_{fb}$ is the resistance of the series resistor and $R_g$ is the resistance of the selected resistor of the plurality of resistors.

In the illustrative embodiment, the positive input of a second amplifier means is coupled to the voltage reference means. A voltage divider is coupled to the positive input of the second amplifier means for simulating the load at the output of the first amplifying means. Indicating means, such as a light emitting diode, are coupled to the output of the second amplifier means for indicating the battery condition.

In the illustrative embodiment, the system takes the form of a battery-operated motor control circuit, operating to drive an ambulatory infusion pump for infusing fluids into a patient.

A more detailed explanation of the invention is provided in the accompanying drawings.

BRIEF DESCRIPTION OF THE DRAWINGS

The FIGURE is a schematic circuit diagram of a voltage regulator circuit constructed in accordance with the principles of the present invention.

DETAILED DESCRIPTION OF THE ILLUSTRATIVE EMBODIMENT

Referring to the drawing, a battery 10 having its negative terminal connected to ground is connected to a double pole, triple throw switch 12, 95 having "run" terminals 13, 96, "off" terminals 14, 97 and "test" terminals 15, 98. Run terminal 96 and test terminal 98 are connected to a drain terminal 16 of a current regulator circuit 18. Current regulator circuit 18 comprises an FET 20 and a resistor 22. The source terminal 23 is connected to the gate 24 through resistor 22 and gate 24 is connected to a potentiometer 26 which is connected to ground through resistor 28.

The arm of potentiometer 26 is connected via line 32 to the positive terminal of an operational amplifier 34. The output of operational amplifier 34 is connected through resistor 36 to the base of an NPN transistor 38, the collector of which is connected to the base of a PNP transistor 40 and the emitter of which is connected to the collector of transistor 40 through resistor 42. The emitter of transistor 38 is connected to ground through resistor 44.

Transistors 38 and 40 comprise a power booster circuit for operational amplifier 34. The operational amplifier 34 cannot alone drive a motor as required, because it does not have suitable power. Further, the saturation output voltage of operational amplifier 34 would be a problem even if it could drive the motor. By connecting transistors 38 and 40 so that the collector of transistor 38 drives the base of transistor 40, a double inversion is obtained, thereby resulting in the same phase as the output of operational amplifier 34. This enables a feedback circuit to the negative terminal of operational amplifier 34 from the collector of transistor 40, through current limiting resistor 46, line 48, line 50 and resistor 52. The resulting circuit has an extremely low voltage drop between the output and power source. For example, a power source of 2.2 volts can be used to regulate a final output voltage to the motor requirement of 2.1 volts or to within about 0.1 volt of the battery voltage.

Output line 48 is coupled to motor 54 and also through resistor 56 to a terminal 58 which may be connected to measuring means, such as a meter or a computer.

Ratio control means 60 is coupled via line 62 to the negative input terminal of operational amplifier 34. Ratio control means 60 comprises parallel connected resistors 64, 66 and 68, with a grounded single pole switch arm 70 that is adapted for connecting to either resistor 64 by contacting terminal 4, resistor 66 by contacting terminal 3, resistor 68 by contacting terminal 2 or no resistor by contacting terminal 1. Resistor 64 has the lowest resistance, resistor 66 has the next lowest resistance, resistor 68 has a higher resistance and, of course, an infinite resistance is provided when the switch arm 70 contacts terminal 1.

Resistors 64, 66 and 68 can be selected to provide a predetermined speed ratio for the motor, once the initial speed of the motor is calibrated. In order to calibrate the initial speed of the motor, switch arm 70 is connected to terminal 4 of ratio control means 60. This will be the highest speed of the motor at which there is most ripple thereby providing the greatest spikes for the operator to observe. Assuming that motor 54 is a five-pole motor, there will be ten spikes per revolution of the motor. By coupling measuring means to terminal 58 and knowing that there are ten spikes per revolution of the motor, it is simple to determine the precise speed over the motor for a particular time period. This is most easily accomplished when the switch arm 70 is connected to terminal 4 because of the large ripple that is achieved. While the operator notes the speed at output 58, the precise speed desired is calibrated by moving arm 30 of potentiometer 26. Once this maximum speed is calibrated, the other selected speeds are obtained by merely moving switch arm 70 of gain control means 60 to terminal 3, or 2 or 1, depending upon the speed desired.

With switch arm 70 at terminal 1, motor 54 has the same voltage as the voltage on line 32. With switch arm 70 at terminal 2, motor 54 has the voltage on line 32 times $(1+R_{fb}/R_g)$ where $R_{fb}$ is the resistance of resistor 52 and $R_g$ is the resistance of 68. Likewise, when switch arm 70 is connected to terminal 3, motor 54 will have the voltage on line 32 times $(1+R_{fb}/R_g)$ where $R_{fb}$ is the resistance of resistor 52 and $R_g$ is the resistance of resistor 64.

A test circuit 74 is provided as follows. Arm 30 of potentiometer 26 is connected to the positive input terminal of a second operational amplifier 76. The output of operational amplifier 76 is connected to the base of a PNP transistor 78 through resistor 80. The collector of PNP transistor 78 is connected to an indicating means 82, in the form of an LED, through resistor 84. The negative input of operational amplifier 76 is connected to a voltage divider circuit comprising a first resistor 86 connected to the positive test terminal 15, a potentiometer 88 and a resistor 90 connected to ground.

Resistors 86 and 90 and potentiometer 88, which form a voltage divider circuit, are of such value to load the battery 10 slightly in excess of the motor load. Thus the energization of an LED in a test made will serve to indicate that the power supply has sufficient reserve to operate the system.

By utilizing the aforementioned circuit, the selected motor speeds will remain constant over various states of charge of battery 10. If the load on motor 54 increases, the voltage at point 92 tends to drop. This is sensed at the negative input of operational amplifier 34 which drives the output at point 92 back to its initial level increasing motor torque. At stall the circuit is protected and the motor torque is limited by resistor 46. After the voltage on line 32 has been set, arm 94 of potentiometer 88 can be moved to adjust operational amplifier 76 so that LED 82 will be a low voltage indicator.

The system is particularly useful in an ambulatory low volume infusion pump. Typically, four desired flow rates may be appropriate. Thus resistors 64, 66 and 68 are elected so as to provide the proper flow speed ratios.

When the system is not in use, switch 12 will be in its "off" position. Testing may be accomplished by placing the switch in the "test" position and operation of the motor 54 is accomplished with the switch in the "run" position.

It is seen that a voltage regulator circuit has been provided that is operative with a battery-operated motor to provide predictable accurate motor speeds, notwithstanding variable loads and notwithstanding the variable input voltages resulting from variations in the condition of the battery voltage.

Although an illustrative embodiment of the invention has been shown and described, it is to be understood that various modifications and substitutions may be made without departing from the novel spirit and scope of the present invention.

That which is claimed is:

1. A voltage regulator circuit which comprises:

a DC voltage input;

means coupled to said input for providing a voltage reference;

first amplifier means having a positive input, a negative input and an output, said first amplifier means having one of its inputs coupled to said voltage reference means;

ratio control means coupled to the other input of said amplifier means for setting the gain of said first amplifier means;

feedback means coupled from an output of said first amplifier means to said other input of said first amplifier means;

a second amplifier means having a positive input, a negative input and an output;

means coupling said voltage reference to one of the inputs of said second amplifier means;

a voltage divider coupled to the other input of said second amplifier means for simulating the load at the output of said first amplifier means; and indicating means coupled to the output of said second amplifier means;

said first amplifying means including a pair of transistors connected to provide a double inversion.

2. A voltage regulator circuit as described in claim 1, said first amplifying means including an NPN transistor the base of which is coupled to the output of said first amplifier means, a PNP transistor the base of which is coupled to the collector of said NPN transistor, a resistor coupling the emitter of said NPN transistor to the collector of the PNP transistor; said feedback means coupling the collector of said PNP transistor to the negative input of the first amplifier means.

3. A voltage regulator circuit which comprises:

a DC voltage input;

means coupled to said input for providing a voltage reference;

first amplifier means having a positive input, a negative input and an output, said first amplifier means having one of its inputs coupled to said voltage reference means;

ratio control means coupled to the other input of said amplifier means for setting the gain of said first amplifier means;

feedback means coupled from an output of said first amplifier means to said other input of said first amplifier means;

a second amplifier means having a positive input, a negative input and an output;

means coupling said voltage reference to one of the inputs of said second amplifier means;

a voltage divider coupled to the other input of said second amplifier means for simulating the load at the output of said first amplifier means; and indicating means coupled to the output of said second amplifier means;

said ratio control means comprising a plurality of resistors and means for coupling to ground a selected resistor of said plurality.

4. A voltage regulator circuit as described in claim 3, said feedback means including a series resistor and said ratio means being operative to provide a voltage ratio factor at the input of the first amplifier means that is equal to about $1 + R_{fb}/R_g$ where $R_{fb}$ is the resistance of said series resistor and $R_g$ is the resistance of the selected resistor of said plurality.

5. A voltage regulator circuit which comprises:

a DC voltage input;

means coupled to said input for providing a voltage reference;

first amplifier means having a positive input, a negative input and an output, said first amplifier means having one of its inputs coupled to said voltage reference means;

ratio control mens coupled to the other input of said amplifier means for setting the gain of said first amplifier means;

feedback means coupled from an output of said first amplifier means to said other input of said first amplifier means;

a second amplifier means having a positive input, a negative input and an output;

means coupling said voltage reference to one of the inputs of said second amplifier means;

a voltage divider coupled to the other input of said second amplifier means for simulating the load at the output of said first amplifier means; and indicating means coupled to the output of said second amplifier means;

said second amplifying means including an amplifier coupled to the output of an operational amplifier; and said indicating means being coupled to the output of said amplifier.

6. A voltage regulator circuit as described in claim 5, said amplifier comprising a transistor and said indicating means comprising a light emitting diode.

7. A voltage regulator circuit which comprises:

a DC voltage input;

means coupled to said input for providing a voltage reference;

first amplifier means having a positive input, a negative input and an output, said first amplifier means having one of its inputs coupled to said voltage reference means;

ratio control means coupled to the other input of said amplifier means for setting the gain of said first amplifier means;

feedback means coupled from an output of said first amplifier means to said other input of said first amplifier means;

a second amplifier means having a positive input, a negative input and an output;

means coupling said voltage reference to one of the inputs of said second amplifier means;

a voltage divider coupled to the other input of said second amplifier means for simulating the load at the output of said first amplifier means; and indicating means coupled to the output of said second amplifier means;

means for adjusting said voltage reference means;

a motor coupled to an output of said first amplifier means;

a mesurement terminal coupled to said first amplifier means output;

said adjusting means being operative to calibrate the motor speed;

said ratio control means being operable to selectively control the motor speed, said ratio control means comprising a plurality of resistors and means for coupling to ground a selected resistor of said plurality.

8. A voltage regulator circuit which comprises:

a DC voltage input;

means coupled to said input for providing an adjustable voltage reference, said adjustable voltage reference means comprising a current regulating circuit in series with a potentiometer;

first amplifier means having a positive input, a negative input and an output;

the arm of the potentiometer being coupled to said positive input, thereby providing an adjustable voltage reference;

ratio control means coupled to the negative input of said first amplifier means for setting the gain of said first amplifier means, said ratio control means comprising a plurality of resistors and means for coupling to ground a selected resistor of said plurality;

feedback means coupled from an output of said first amplifier means to said other input of said first amplifier means;

said feedback means including a series resistor and said ratio means being operative to provide a voltage ratio factor at the input of the amplifier means that is equal to about $1 + R_{fb}/R_g$ where $R_{fb}$ is the resistance of said series resistor and $R_g$ is the resistance of the selected resistor of said plurality;

a motor coupled to an output of said first amplifier means;

a measurement terminal coupled to said first amplifier means output; and said potentiometer arm being operative to calibrate the motor speed.

9. A voltage regulator circuit as described in claim 8, including second amplifier means having a positive input, a negative input and an output;

means coupling said voltage reference to the input of said second amplifier means;

the voltage divider coupled to the positive input of said second amplifier means for simulating the load at the output of said first amplifier means; and indicating means coupled to the output of said second operational amplifier.

10. A voltage regulator circuit as described in claim 9, said second amplifier means including an amplifier coupled to the output of an operational amplifier; and said indicating means coupled to the output of said amplifier.

11. A voltage regulator circuit as described in claim 10, said first amplifying means including a pair of transistors connected to provide a double inversion, said pair comprising an NPN transistor the base of which is coupled to the output of said first amplifier means, a PNP transistor the base of which is coupled to the collector of said NPN transistor, a resistor coupling the emitter of said NPN transistor to the collector of the PNP transistor; said negative feedback means coupling the collector of said PNP transistor to the negative input of the first amplifier means.

12. A battery-operated motor control circuit, which comprises:
a battery;
means coupled to said battery for providing an adjustable voltage input;
first amplifier means having a positive input; a negative input and an output, the positive input being coupled to said adjustable voltage input;
ratio control means coupled to the negative input of said first amplifier means for setting the gain of said first amplifier means and thus setting the speed of the motor, said ratio control means being operable to selectively control the motor speed in discrete increments;
negative feedback means coupled from an output of said first amplifying means to the negative input of said first amplifier means;
means coupling an output of said first amplifying means to the motor;
said ratio control means comprising a plurality of resistors and means for coupling to ground a selected resistor of said plurality.

13. A device as described in claim 12, said feedback means including a series resistor and said ratio control means being operative to provide a voltage ratio factor at the input of the first amplifier means that is equal to about $1+R_{fb}/R_g$ where $R_{fb}$ is the resistance of said series resistor and $R_g$ is the resistance of the selected resistor of said plurality.

14. A battery-operated motor control circuit, which comprises:
a battery;
means coupled to said battery for providing an adjustable voltage input;
first amplifier means having a positive input; a negative input and an output, the positive input being coupled to said adjustable voltage input;
ratio control means coupled to the negative input of said first amplifier means for setting the gain of said first amplifier means and thus setting the speed of the motor, said ratio control means being operable to selectively control the motor speed in discrete increments;
negative feedback means coupled from an output of said first amplifying means to the negative input of said first amplifier means;
means coupling an output of said first amplifying means to the motor;
second amplifier means having a positive input, a negative input and an output; means coupling said adjustable voltage input to the positive input of said second amplifier means;
a voltage divider coupled to the negative input of said second amplifier means for simulating the load at the output of said first amplifying means; and
indicating means coupled to the output of said second amplifier means.

15. A battery-operated motor control circuit, which comprises:
a battery;
means coupled to said battery for providing an adjustable voltage input;
first amplifier means having a positive input; a negative input and an output, the positive input being coupled to said adjustable voltage input;
ratio control means coupled to the negative input of said first amplifier means for setting the gain of said first amplifier means and thus setting the speed of the motor, said ratio control means being operable to selectively control the motor speed in discrete increments;
negative feedback means coupled from an output of said first amplifying means to the negative input of said first amplifier means;
means coupling an output of said first amplifying means to the motor;
said first amplifier means including an NPN transistor the base of which is coupled to the output of said first amplifier means, a PNP transistor the base of which is coupled to the collector of said NPN transistor, a resistor coupling the emitter of said NPN transistor to the collector of the PNP transistor; said negative feedback means coupling the collector of said PNP transistor to the negative input of the first amplifier means.

* * * * *